Jan. 8, 1952 C. M. PAGE 2,581,812
FLAMMABLE GAS DETECTOR
Filed Oct. 18, 1948 4 Sheets-Sheet 1
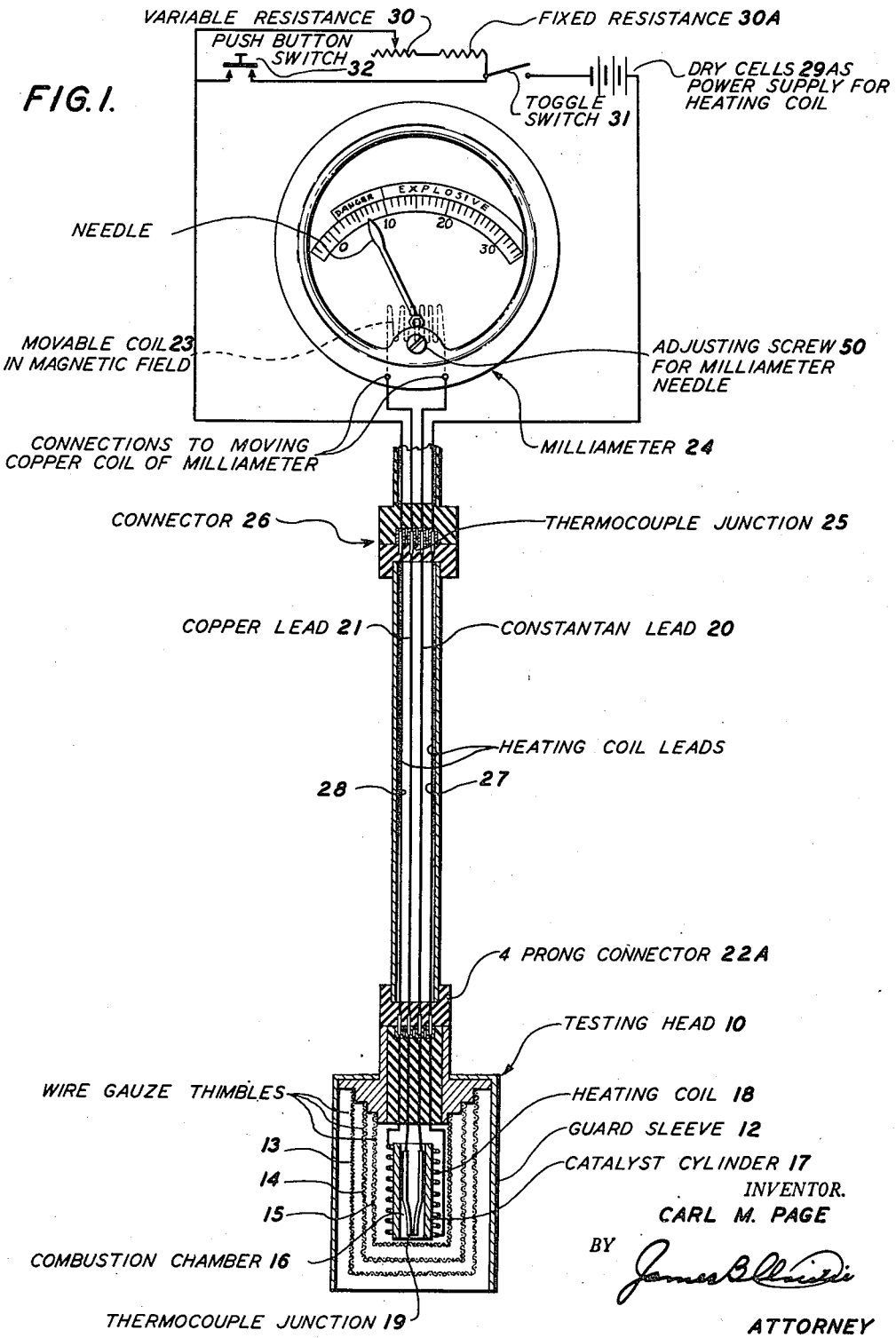
FIG.I.

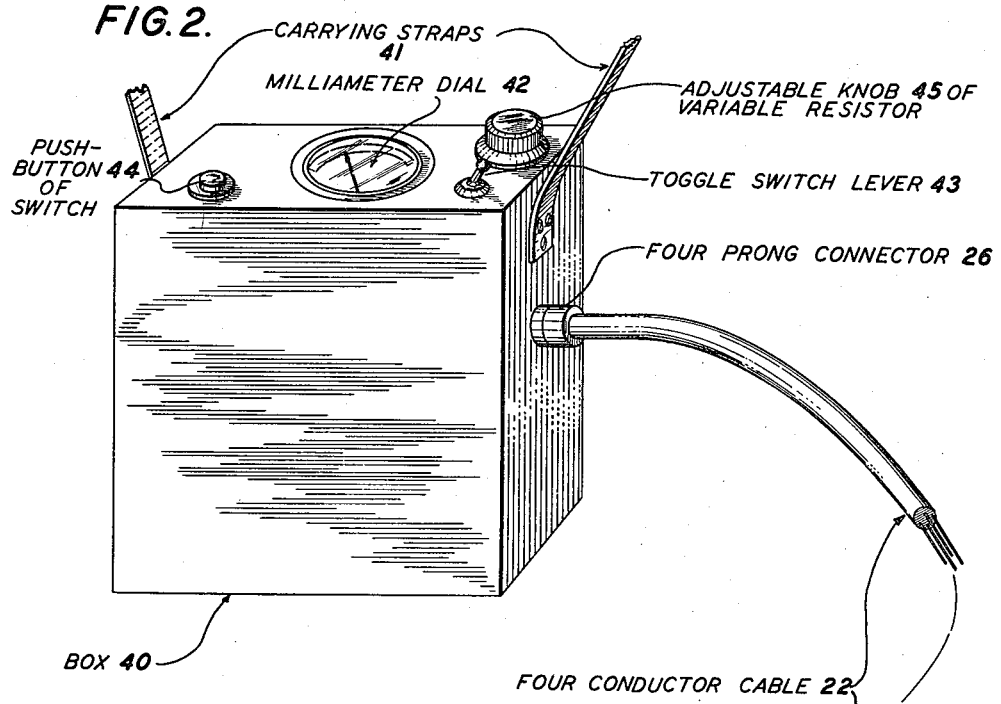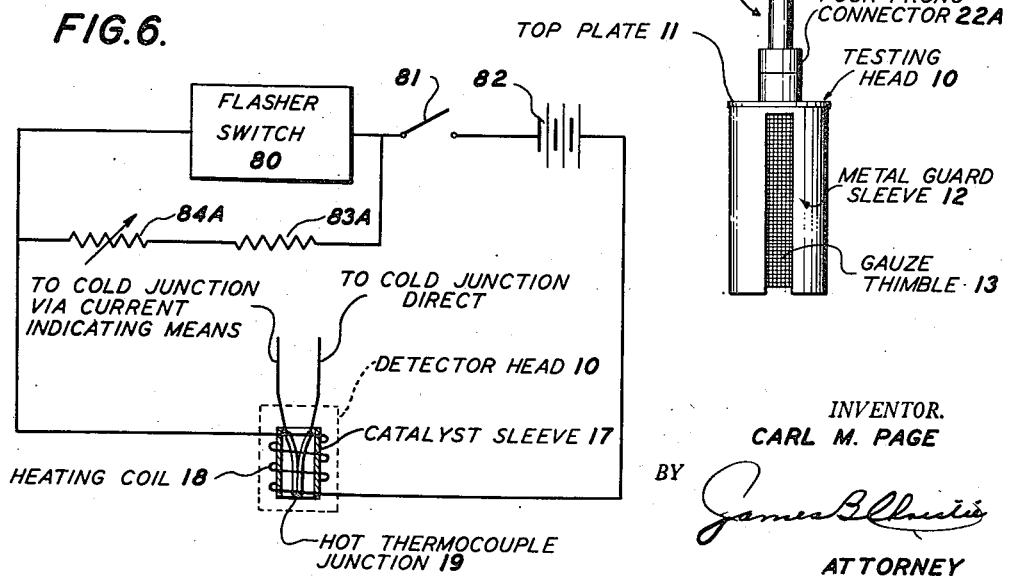

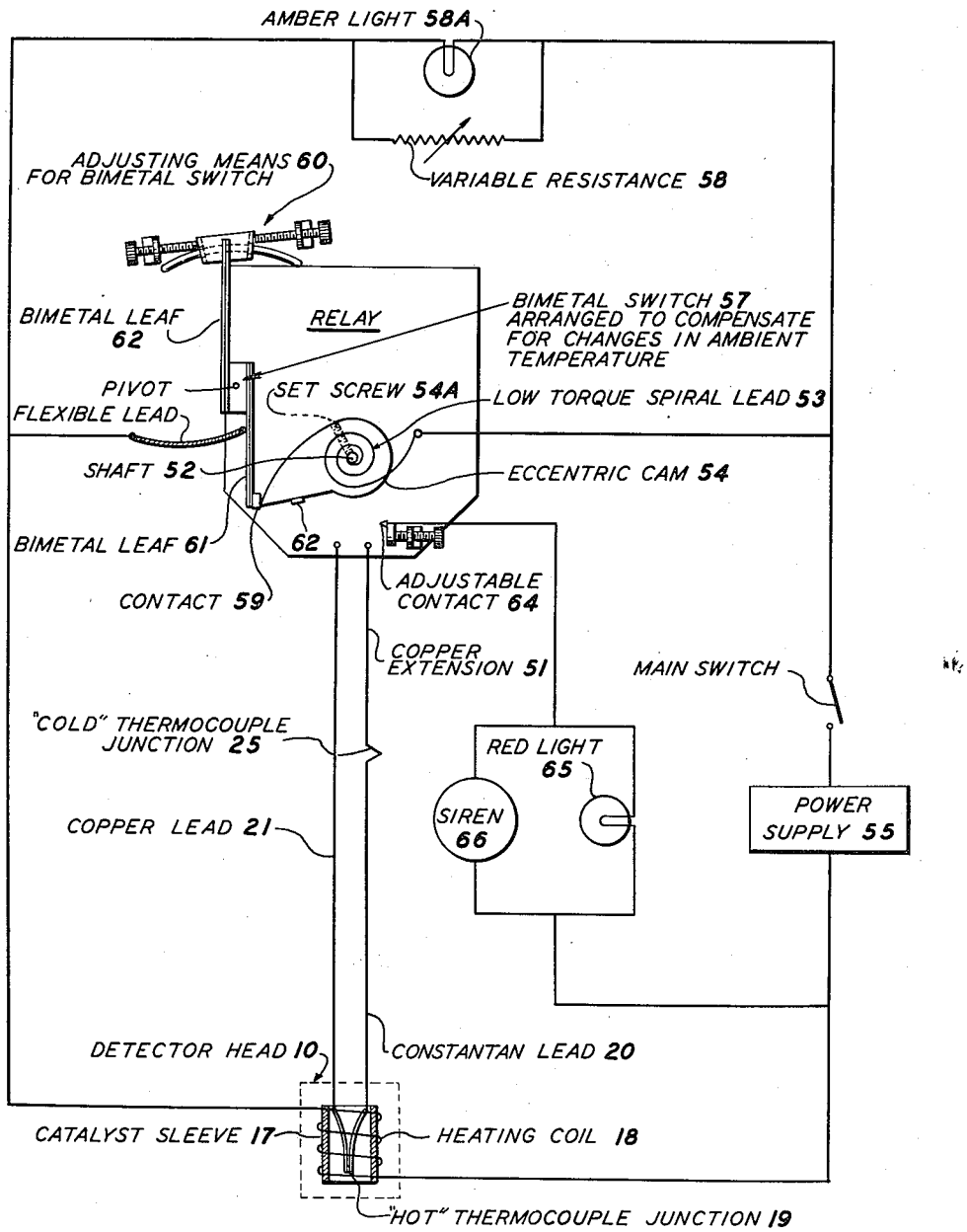

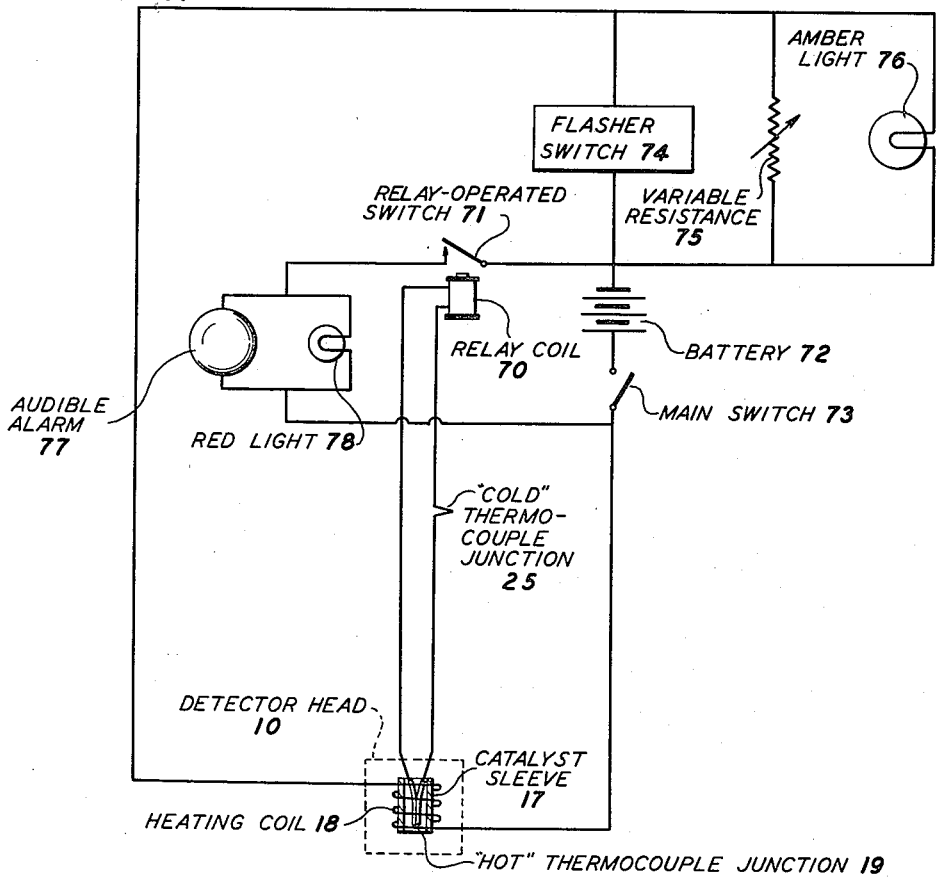
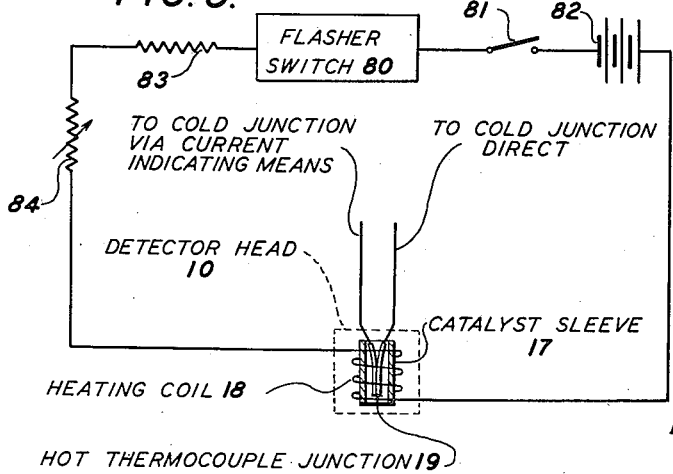

Patented Jan. 8, 1952

2,581,812

UNITED STATES PATENT OFFICE 2,581,812

FLAMMABLE GAS DETECTOR

Carl M. Page, Van Nuys, Calif.

Application October 18, 1948, Serial No. 55,221

5 Claims. (Cl. 23—255)

1

This invention is concerned with the detection of flammable gas and more particularly with the measurement of the concentration of flammable or combustible gas in gaseous mixtures. One of its major applications is the detection and location of leaks in buried gas mains and the like, but it is generally applicable to the detection of flammable gas mixtures and to the measurement and indication of the concentration of flammable constituent therein. By way of example, it is useful for sampling and testing the atmosphere in mines, underground vaults, manholes, tanks, including those in tank ships, petroleum storage tanks, automotive tankers, etc. Even when such tanks are supposedly empty inflammable or explosive mixtures may be present, and can be ignited in repair operations involving welding, etc. In short, the apparatus of the invention is applicable wherever it is desirable to make a spot-analysis of any atmosphere to determine its explosibility or its approach to this condition.

In locating leaks in buried gas mains it is customary to make a series of bar or bore holes (say 30 inches deep) in the ground at intervals along the course of the main and to attempt to measure the concentration of gas leaking into or collecting in each hole. A variety of apparatus has been developed for detecting the presence of the gas in the bar or bore hole and measuring its concentration, but thus far portable apparatus for this use, even in the hands of a skilled operator, is not entirely reliable and leaks may be missed by substantial distances, thus increasing the time and labor involved in uncovering the pipe and making the repair.

A common form of apparatus for gas leak detection comprises a Wheatstone bridge with a galvanometer connected across it. In one leg of the bridge an electrically conductive element (say a platinum resistance coil) for inducing combustion is connected, and an identical electrically conductive element is connected in the opposite leg of the bridge. Both elements are highly heated by passage of electric current from a suitable source, say a D. C. battery. One of the elements (say a platinum resistance coil) is enclosed in a gas-tight housing and serves as a standard of comparison. Its twin is arranged to be brought into contact with the gas to be investigated, usually by being enclosed in a combustion chamber or box provided with an inlet tube which may be dropped into the bar hole and an outlet tube provided with a resilient aspirator or suction bulb. Flame arresters are placed in both tubes so that combustion started in the chamber or box by the heated element cannot spread outside the box. The simplest type of flame arrester is one or more sheets of gauze of conductive material, say fine copper mesh, such as that employed many years ago by Sir Humphry Davy in the first miners' safety lamps.

The gas to be tested usually is brought into contact with the heated element by dropping the inlet tube into the bar hole and sucking gas up and out of the hole into the box. The gas burns in the box under the influence of the heated element, raises the temperature of the element, changes its resistance, and thus unbalances the bridge, the magnitude of unbalance being measured by the galvanometer.

In the operation of the apparatus just described the operator must first balance the bridge. This is not difficult when the dry cells employed as a power source are new, but when these are approaching the end of their useful life their voltage fails rapidly, and this may occur soon after balancing, resulting in wrong readings on the unsafe side without any warning that error is present. A second difficulty encountered with the apparatus is the difficulty of drawing a representative sample into the box, i. e. the combustion chamber. It has been established that it is difficult if not impossible to suck a representative mixture upward out of the bar hole when the combustible constituent is heavier or lighter than air. Moreover, the accuracy of the apparatus is dependent upon passing a constant volume of gas per unit time through the combustion chamber and this in turn depends upon (1) the resistance offered to the passage of gas by the flash back arresters and (2) the uniform operation of the suction bulb. Accumulations of dust or solid particles on the flash back arresters reduce the volume of gas sucked in per unit time, resulting in a low reading, i. e. on the unsafe side. This has occurred in testing the atmosphere in a paint spray booth where solid pigment particles partially clogged the intake flash back arrester. The maintenance of a constant suction rate with a suction bulb is difficult. The human factor enters. Moreover, it is seldom that a replacement bulb has exactly the same recovery period as its predecessor, and also this has introduced serious error on occasion.

The foregoing sampling difficulties may be avoided by actually placing the combustion element, protected by a suitable flash back arrester, in the bar hole. However, this requires the use of long electrical leads to the rest of the bridge circuit. These leads must be carefully calibrated, and even after calibration strains induced in the leads through flexure may change resistances and thus impair the accuracy of results.

Apparatus of the type described above does not read accurately below the lower explosive limit. In fact, the galvanometer or such devices employed to measure the amount of bridge unbalance has a needle which reads full scale at the lower explosive limit. If the concentration of combustible gas rises above the lower explosive limit, the reading is meaningless, unless the equipment is provided with a diluting or so-called "multiplier valve" which bleeds in a diluent gas and lowers the concentration of combustible gas in the mixture being tested.

If the concentration of gas in the combustion chamber rises above the lower explosive limit, a series of explosions occurs in the chamber and the temperature of the heated element fluctuates rapidly, with resultant rapid fluctuation of the galvanometer needle. This interferes with accurate readings.

All of the foregoing difficulties are avoided with the apparatus of my invention, which in essence comprises a combustion catalyst (say a hollow cylinder of platinized asbestos) electrical heating means disposed in a good heat conductive relationship with the catalyst (say a heating coil wound round the cylinder) a thermocouple having one junction adjacent the catalyst (say inside the cylinder and in contact therewith) and the other junction remote therefrom, current indicating means (say a galvanometer or an electric alarm system) connected to the thermocouple, a circuit for supplying current to the electrical heating means, and means connected in the circuit to assure that sufficient current is supplied to the heating means to keep the catalyst from dropping below a certain minimum temperature during the test period.

The means connected in the heating current circuit to assure that the catalyst does not cool below a certain minimum temperature during operation may take several forms. For example, the circuit may be so arranged that when it is closed a small amount of current is supplied continuously to the heating means. In this modification, means such as a switch in a shunt circuit by-passing a resistance to the main circuit, can be employed to increase the flow of current to the heating means at intervals, so that the catalyst can be cleansed frequently and reactivated by heating it highly.

In another modification, the heating means for the catalyst, say a coil of high resistance wire, is connected in series with a battery of dry cells which supply the heating current when a main switch, likewise in series, is closed. A flasher switch is also connected in series in the circuit. It interrupts the flow of current to the coil whenever it opens, but its period of movement and time of contact is so adjusted that the heat thus supplied intermittently is sufficient to keep the catalyst up to a minimum temperature of, say 300° F., to enable the catalyst to promote the combustion of certain very dilute gaseous mixtures. A variable resistance is connected in the circuit, either in series with the flasher switch or in a shunt around it for adjusting the overall current flow in the circuit.

It is desirable to employ a porous catalytic member in which the combustion is confined to the pores. As indicated above, platinized asbestos in the form of a cylinder or other hollow receptacle is suitable. The other metals of the platinum group, including palladium, osmium, and rhodium, may be employed in like fashion.

If desired, sufficient of the metallic catalyst may be deposited in the asbestos or other carrier to enable the catalyst to serve also as a resistance. In other words, the heating coil may be eliminated and the catalyst heated by direct passage of current through it.

In another variant of the apparatus of my invention, porous platinum black or the like is deposited directly on the heating coil, the porous asbestos carrier being eliminated. However, in substantially all cases it is desirable to employ a porous catalyst in which combustion is confined substantially to the pores. This avoids explosions, etc., which have made readings difficult with prior apparatus above the lower explosive limit.

In the operation of one form of the device, the electrical heating means, the catalyst and the first junction of the thermocouple, all enclosed in a flame arrester, say a thimble of metal gauze, are first tested in air containing no combustibles. The circuit is closed and adjusted so that a small amount of heating current, necessary to maintain the catalyst in active condition for very low concentrations of combustible gas, is supplied either continuously or discontinuously. The galvanometer needle is adjusted to zero. Then the thimble is lowered into a bar hole, storage tank, or other atmosphere to be tested. The current to the heating coil is augmented periodically and intermittently. This sends surges of current to the coil and surges of heat to the catalyst, so that it is continuously reactived. If combustible gas is present, it will burn in the immediate neighborhood of the catalyst and sustain a relatively high temperature at the adjacent thermocouple junction. The current flow in the thermocouple will be a function of the heat generated by the combustion, and this will be observed at the galvanometer, which conveniently is calibrated in terms of concentration of combustible gas.

The apparatus of the invention, as the following detailed description will show, is simple, rugged and reliable. Difficulties of bridge balancing are eliminated, since no bridge is needed. Sampling difficulties are avoided, since the thimble may be placed at the point at which the gas to be analyzed exists and gas flow through the combustion chamber is assured. Manual errors due to pumping variations are eliminated, and lastly, the apparatus gives reliable readings throughout the entire range of combustibility. The readings are made easy in this device because the preferred form of meter is "dead beat," i. e. the meter moves steadily to the true reading and stops without "hunt" or fluctuation.

These and other aspects of the invention are explained in detail hereafter with reference to the accompanying drawings in which:

Fig. 1 is a wiring diagram, partly in section, of one presently preferred form of the apparatus;

Fig. 2 is a perspective view, showing additional details of the apparatus of Fig. 1;

Fig. 3 is a wiring diagram of a modified form of the apparatus of Figs. 1 and 2;

Fig. 4 illustrates a further form of the invention particularly adapted for continuous testing and provided with an alarm system;

Fig. 5 is a wiring diagram of an alternative heater circuit for the apparatus of Figs. 1 and 2; and Fig. 6 is a wiring diagram of still another type of heater circuit for the apparatus of Figs. 1 and 2.

The apparatus of Figs. 1 and 2 has a testing head 10 comprising a solid top member 11 with an outer guard sleeve 12 in the form of a vertically slit cylinder of thin metal sheet, say stainless steel. Within the guard sleeve are three metal gauze thimbles 13, 14, 15, one within the other and all fastened to the top plate and of generally cylindrical form. The thimbles, top plate and guard enclose a chamber 16 containing a small catalyst cylinder 17, say one quarter of an inch in outside diameter and three quarters of an inch long. Conveniently the cylinder is of platinized asbestos and is relatively porous. On the outside of this cylinder is wound a heating coil 18 of thin wire of high resistance, say Nichrome of 33 gauge. Within the cylinder and in good thermal conductivity therewith is a thermocouple junction 19 between two leads of different metals. One of the leads 20 conveniently is of constantan and the other 21 is copper, although any convenient thermocouple metals may be used.

The leads from the heating coil and the two thermocouple leads pass up through the top plate and connect by means of a four prong connector plug 22A into a cable 22 (see Fig. 2).

The copper thermocouple lead is connected to the moving coil 23, also of copper, of a conventional galvanometer 24 (say a milliammeter). The coil lies in the field of a permanent magnet (not shown). The constantan thermocouple lead 20 is connected to the other side of the galvanometer coil, so that this connection is the other thermocouple junction 25 between copper and constantan. Conveniently, this second junction is made in a conventional four prong connector 26.

If desired, the cold thermocouple junction 25 may be located in the connector 22A instead of in the connector 26. In such case the constantan extends only to the plug 22A, the balance of the lead 20 above this plug being of copper.

The two leads 27, 28 from the heating coil in the testing head pass through the cable and plug and are connected with a dry cell battery 29 (supplying about 6 volts) in series with a fixed resistance 30A and a variable resistance 30 or rheostat and a toggle switch 31 (single-pole, single-throw) which serves to interrupt the heating circuit completely when it is open.

The variable resistance and fixed resistance are shunted by a push button switch 32 of low resistance.

The milliammeter 24 may be of any convenient form, but I prefer to employ one having arbitrary graduations and marked to indicate (a) dangerous concentrations of combustible gas and (b) explosive concentrations. It happens that the heat generated in the catalytic combustion of most gases at their lower explosive limit is about the same, so that the graduations of the galvanometer can be the same for a variety of types of gases including most flammable gases and vapors commonly found in industry. Notable exceptions are hydrogen, hydrogen sulphide, and carbon bisulphide for which special graduations or conversion tables are desirable.

The apparatus of the invention may be made in compact convenient portable form. The testing head need not have an overall diameter exceeding one inch, so that it may be lowered into narrow bar holes and other small openings. The combustion occurs in small space, and for the most part the gas is burned smoothly within the pores of the catalyst cylinder. The split guard on the outside of the testing head serves a dual function in that it protects the gauze thimbles, etc., and also creates a chimney effect, so that the gas to be tested flows up through the combustion chamber continuously.

The entire apparatus, save for the testing head and the cable, may be included in a small box or case 40 (see Fig. 2), say a box six inches high, eight inches wide and three inches deep. This box contains the dry cell battery 29 and has the four prong connector 26 on its side or bottom. The cable is attached to the box and to the elements which it contains through this connector. Thus the two leads of the heating circuit are connected to the battery through the resistance and the two switches. The two thermocouple leads are connected through the plug to the galvanometer, the second or cold copper-constantan junction of the thermocouple being made in the plug itself, i. e. either in the plug 22A or in the plug 26.

The box or case is provided with carrying straps 41 so that the operator can carry it on his belly or chest. The galvanometer dial 42 is mounted in the top of the case for easy observation, and all the controls are also in the top of the case. Thus the lever 43 of the toggle switch is mounted in one corner, with the push button 44 of the other switch in another corner. The control knob 45 of the rheostat or variable resistance is likewise mounted on the top.

The cable 22 may be of any convenient length and preferably is flexible, but ordinarily need not be more than about six feet long for work in locating gas main leaks, etc. In such an operation a series of vertical bar holes about 30 inches deep are driven at intervals along the course of a buried gas main in the zone where the leak is suspected. The operator closes the toggle switch with the testing head in unpolluted air (i. e. air containing no combustibles). He then adjusts the variable resistance to give the amount of continuous heating current necessary to keep the catalyst active for minute concentrations of natural gas or produce gas in air (say 300° F.) by adjusting the milliammeter needle to zero position with the adjusting screw 50. He then drops the testing head in the first bar hole and presses the push button switch intermittently, say at intervals of 20 seconds, to send a series of current surges to the heating coil in the testing head. These current surges are sufficient to heat at least a portion of the catalyst surface to a temperature (say 1000° F.) which reactivates the catalyst and eliminates the effects of any previous combustible mixtures which have been tested. If there is a combustible mixture in the bar hole it will enter the catalyst chamber and burn within the pores of the catalyst, thus raising the temperature of the enclosed thermocouple junction and causing a flow of current in the thermocouple circuit through the milliammeter. The richer the content of combustible (say natural gas in the mixture) the higher will be the temperature of the thermocouple junction and the greater the amount of current. The magnitude of the current is read at the milliammeter and noted.

The toggle switch is left closed, and the operation just described is repeated in the next bar hole, etc. until all have been tested. Ordinarily, the bar hole in which the highest concentration of combustible is determined is the one nearest the leak.

By the procedure just described employing the apparatus of the invention it is practicable to locate the leak within a foot or two, thus reducing substantially the amount of excavation required.

Readings are made quickly and accurately with the instrument of the invention and concentrations of combustible gas may be measured even at levels well above the lower explosive limit, the testing head being so constructed that explosions do not occur within the combustion chamber.

The apparatus may be refined and modified in several respects without departing from the scope of the invention as defined in the appended claims. For example, the switch in the shunt circuit which supplies the surges of current to the heating coil may be opened and closed automatically, or if desired the switch in the shunt circuit may be of the type in which the switch is closed manually but opens automatically after a predetermined interval of time. Some of the various forms of the apparatus of the invention are discussed below.

Fig. 3 illustrates a further form of the invention. It is provided with the same type of detector or testing head 10 that is illustrated in detail in Figs. 1 and 2 including the catalyst sleeve 17 enclosing and in good heat conductive relationship with the "hot" junction 19 of the thermocouple. The heating coil 18 is wrapped around the sleeve. The other or "cold" junction 25 of the thermocouple is remote from the catalyst sleeve as in the case of the apparatus of Figs. 1 and 2. Thus one of the thermocouple leads (say the constantan lead 20) is relatively short, and the other lead (say the copper lead 21) extends through a movable copper coil (not shown) of a galvanometer (not shown) and thence via a copper extension 51 to the cold junction.

The galvanometer is of movable coil type and its coil is mounted to turn a shaft 52 upon which an eccentric cam 54 is mounted. As the current through the galvanometer coil increases due to an increased temperature difference between hot and cold junctions the cam is rotated counter-clockwise as viewed in Fig. 3.

The heating coil 18 is connected in series with a power supply 56, the cam, and a bimetal switch 57. A variable resistor 58 is shunted around a portion of the foregoing circuit, namely the cam and the bimetal switch.

The bimetal switch is of known type, in which two bimetal leaves are tied together so that there is no movement of the switch with changes in ambient temperature. It carries a contact 59 on its lower end which presses slightly against the cam when the apparatus is not being used. Customary adjusting means 60, such as a spring-loaded set screw is provided for regulating this pressure. The live bimetal leaves 61, 62 are fastened together and so arranged that when both are heated the same amount their respective flexures counteract each other so that the contact 59 does not move. The lower bimetal leaf 61 is connected in the circuit. The upper leaf 62 is not. When current passes through the lower leaf it is heated and flexed in a direction such that the contact 59 moves away from the cam, thus cutting the supply of current through the lower leaf and permitting it to flex back again to move the contact toward the cam.

The cam is so designed that as it is turned counter-clockwise its surface adjacent the contact 59 moves toward the right, i. e. in a direction tending to disconnect the cam from the contact. With a great increase in the flow of current through the galvanometer coil, the cam turns to the far right (as viewed in Fig. 3). In this position a cam contact 62 engages an adjustable contact 64, thereby completing a circuit through a siren 66 and a red light 65 in parallel with the siren. The minimum amount of thermocouple current (and thus indirectly the amount of flammable gas) required to move the cam into engagement with the contact 64 may be varied by adjustment of the contact.

The operation of the apparatus of Fig. 3 is as follows:

When the main switch is closed and there is no combustible gas at the detector head, a small amount of current, determined by the setting of the variable resistance, runs through the shunt and keeps the catalyst warm. At the same time, some current runs through the bimetal leaf 61, whose electrical resistance is fairly high, so that it is heated and flexed away from and out of contact with the cam. The bimetal leaf 61, with no current flow through it, cools off and returns to its original position of contact with the cam, this process being repeated so that the circuit through the cam and the bimetal switch is made and broken repeatedly. Each time the contact is made there is a lessened resistance to current flow in the circuit as a whole, with a resulting surge of current through the heating coil, as in the cases previously discussed. These surges are desirable because they cause the repeated heating and reactivation of the catalyst.

Now let it be assumed that a mixture of flammable and oxidizing gas comes into the detector head 10, resulting in combustion at the catalyst and heating of the "hot" thermocouple junction. This causes a flow of current through the galvanometer coil and the thermocouple, so that the cam rotates counter-clockwise. If the concentration of flammable gas is very low, this rotation will be insufficient to rotate the cam completely out of contact with the contact 59 on the end of the bimetal. Consequently the surge of current (required for repeated reactivation of the catalyst for low concentrations of flammable gas) will continue. However, if the concentration of flammable gas rises to the point where the cam is rotated to a position where it is continuously out of contact with the contact 59, the surges of current to the heating coil will cease. However, at this point the surges of current are no longer necessary because the concentration of flammable gas is now high enough to heat the catalyst to a temperature at which it is active continuously. The apparatus may be set to stop the current surges at any desired flammable gas concentration by adjusting the position of the contact with respect to the cam with the adjusting means 60. The harder the contact 59 presses on the cam, the higher will be the concentration of flammable required to stop the current surges.

When the concentration of flammable gas drops sufficiently the cam rotates clockwise until it again makes and breaks contact with the bimetal switch, when the surges of current through the heater coil occur again.

With a high concentration of flammable gas in the testing head, there will be a large flow of current through the thermocouple and galvanometer coil, moving the cam and its contact into engagement with the adjustable contact 64, thereby completing the circuit through the siren and red light. The siren and light serve to warn the operator of a dangerous atmosphere. By paralleling the siren and light, the operator is advised of the dangerous condition even though one or the other of the warning devices may be temporarily inoperative. With a decrease in the flow of current the cam and its contact will move clockwise away from the adjustable contact, thus breaking the siren and red light circuit.

The current flowing steadily through the shunt is always sufficient to prevent complete cooling of the catalyst—a desirable feature when the detector head is placed in a drafty spot where a sudden blast of cold air might drop the catalyst temperature so low that the catalyst would be rendered inoperative momentarily. However, the shunt is not essential to the apparatus of Fig. 3, provided that the bimetal switch is so set that it supplies sufficient current in surges to prevent the catalyst from cooling to a temperature at which it will not catalyze the combustion of certain very dilute gaseous mixtures already discussed.

Fig. 4 illustrates a form of the apparatus of the invention in which the meter, say a galvanometer, is replaced by an alarm system so set that it operates when a predetermined concentration of flammable gas is encountered. It may be employed as a monitor, and is useful in situations in which workmen should be advised immediately that a dangerous condition arises. By way of example, a welder working in an apparently empty oil tank may, by heating the plates at a seam, vaporize enough hydrocarbon, say gasoline, out of the seam to produce an explosive mixture at the point that the heating occurs. To avoid such occurrences, the welder can be provided with an apparatus like that of Fig. 4. He keeps it near him during his work, and it is set to warn him if a flammable or explosive mixture appears.

The apparatus of Fig. 4 employs a detector head 10 similar to that of Figs. 1, 2 and 3. This contains the "hot" thermocouple junction 19 encased in the catalyst sleeve 17 around which the heating coil 18 is wrapped. It is provided with a "cold" thermocouple junction 25 as described in relation to the earlier figures, but the thermocouple circuit includes the coil 70 of a solenoid operated relay switch 71 instead of the galvanometer coil. A power source, say a dry cell battery 72 is connected in series with the heater coil through a main switch 73, the other side of the heater coil being a flasher switch 74 in parallel with a variable resistance 75 and an amber light 76.

The battery also supplies power to a circuit consisting of the contacts of the solenoid operated switch, an audible alarm 77 such as a buzzer or siren in parallel with a red lamp 78 and the main switch 73.

The flasher switch is of the type employed in electric signs, etc. It may take a variety of forms, but a simple variety is one employing a bimetal member having a snap action and heated by electric current passed through it. The switch is closed in its unheated condition, but snaps open as it is heated, interrupting the current and allowing it to cool and snap closed once more. The frequency of movement and duration of contact of such flasher switches are adjustable and they are available in totally enclosed form—which is desirable in the instant case. When the main switch of the apparatus of Fig. 4 is closed, a small current flows to the heater coil through the variable resistance 75. Surges of current are supplied to the heater coil repeatedly through the flasher switch. The resistance of the flasher switch is made low so that each time it closes it effectively short circuits the amber lamp, so that there is insufficient current flow through it to light it. The amber lamp thus flashes in synchronism with the flasher switch advising the operator that the apparatus is operating and that current is being supplied to the heater coil. As long as no combustion occurs in the detector head, the action described above is repeated, and the relay or solenoid operated switch is adjusted so that it does not trigger until a predetermined concentration of combustible gas is sensed in the detector head. When this occurs, the switch 71 is closed supplying current to the audible alarm and the red light so that there are visual and audible alarm signals of the approach of a dangerous condition.

The apparatus of Fig. 4 is rugged and simple. It has no moving parts in its detector head, and is particularly suitable as an alarm for workmen operating in an atmosphere which suddenly may become dangerous.

As in the case of the apparatus of Fig. 3, the variable resistance shunting the flasher switch is not essential but is desirable.

Fig. 5 is a wiring diagram of a heater circuit for the apparatus of the invention in which the intermittent heating and cooling of the catalyst is governed by a flasher switch 80 of the type already described and in which the frequency of make and break of the switch and the duration of contact are adjusted precisely so that in the periods in which no heating current flows, the catalyst will not cool to a point at which it will not support combustion of certain dilute mixtures, such as hydrocarbon vapors in air. In the apparatus of Fig. 5 the detector head 10 is the same as that described in connection with Figs. 1 and 2, and includes the "hot" thermocouple junction 19, the surrounding catalyst sleeve 17, and the heating coil 18. The heating coil is connected in series with the flasher switch 80, a main switch 81, a power source such as a dry cell battery 82, a fixed resistance 83, and a variable resistance 84.

When the main switch is closed, current flows to the heating coil as long as the flasher switch is closed, the amount of current thus supplied being adjusted by the variable resistance to assure that at least some part of the catalyst is heated to a sufficient reactivation temperature, say 1100° F. When the flasher switch snaps open due to the heating of its bimetal element by the current passing through it, the entire circuit is broken momentarily and the heating coil tends to cool off. The period of make and break and the duration of contact of the flasher switch are however, so adjusted that the heater coil and its associated catalyst do not cool excessively, say below 300° F. before the flasher switch again closes as its bimetal cools and snaps back.

The circuit of Fig. 6 is identical with that of Fig. 5 with the exception that the fixed resistance 83 and the variable resistance 84 in series with the flasher switch are replaced by a fixed resistance 83A and a variable resistance 84A shunted around the flasher switch. The advantage of this arrangement is that when the main switch is closed and the variable resistance 84A properly adjusted there is a continuous but low supply of current to the heater coil, just sufficient to maintain the required minimum temperature, this supply being augmented momentarily by current flow through the flasher switch so that the required intermittent maximum temperature is assured.

I claim:

1. In indicators for combustible gas having a catalyst for the combustion and electrical heating means disposed adjacent the catalyst to heat the catalyst and activate it, the combination which comprises a thermocouple having one junction adjacent the catalyst and its other junction remote therefrom, current indicating means connected to the thermocouple, a circuit for supplying heating current to the electrical means, a resistor in said circuit adapted to pass a small amount of current substantially continuously to the heating means, and a switch operated by-pass of the resistor in the circuit to supply additional current to the heating means when the switch is closed.

2. In indicators for combustible gas having a catalyst for the combustion and electrical heating means disposed adjacent the catalyst to heat the catalyst and activate it, the combination which comprises a thermocouple having one junction adjacent the catalyst and its other junction remote therefrom, current indicating means connected to the thermocouple, a circuit for supplying heating current to the electrical means, an automatic switch in the circuit which opens and closes intermittently, a shunt in said circuit around the switch adapted to supply a small amount of current substantially continuously to the heating means, and automatic means for interrupting the action of the switch when the current in the thermocouple rises to a minimum value.

3. In indicators for combustible gas having a catalyst for the combustion and electrical heating means disposed adjacent the catalyst to heat the catalyst and activate it, the combination which comprises a thermocouple having one junction adjacent the catalyst and its other junction remote therefrom, a switch connected to the thermocouple and actuated thereby, an electric alarm connected to the switch and actuated thereby, a circuit for supplying heating current to the electrical means, a flasher switch in said circuit, and a shunt in said circuit around the flasher switch to supply a small amount of current substantially continuously to the heating means.

4. Apparatus according to claim 3 provided with an electric signalling means connected in parallel with the flasher switch and so constructed that it is inoperative when the flasher switch is closed.

5. In indicators for combustible gas having a catalyst for the combustion and electrical heating means disposed adjacent the catalyst to heat the catalyst and activate it, the combination which comprises a thermocouple having one junction adjacent the catalyst and its other junction remote therefrom, current indicating means connected to the thermocouple, a circuit for supplying heating current to the electrical means, a flasher switch which opens and closes automatically in the circuit so as to supply surges of current to the heating means and a shunt in the circuit around the flasher switch for supplying a small amount of current continuously to the heating means.

CARL M. PAGE.

REFERENCES CITED

The following references are of record in the file of this patent:

UNITED STATES PATENTS

| Number | Name | Date |
|---|---|---|
| 1,321,063 | Lamb and Larson | Nov. 4, 1919 |
| 1,779,569 | Thompson | Oct. 28, 1930 |
| 1,880,941 | Erickson | Oct. 4, 1932 |
| 2,219,391 | Jacobson | Oct. 29, 1940 |
| 2,234,128 | Miller | Mar. 4, 1941 |

FOREIGN PATENTS

| Number | Country | Date |
|---|---|---|
| 521,098 | Great Britain | May 13, 1940 |